US012618797B2

(12) United States Patent
Yamakawa et al.

(10) Patent No.: US 12,618,797 B2
(45) Date of Patent: May 5, 2026

(54) ELECTROLYTE MEASURING STRUCTURE, FLOW-TYPE ION-SELECTIVE ELECTRODE USING THE SAME, AND ELECTROLYTE MEASURING DEVICE

(71) Applicant: Hitachi High-Tech Corporation, Tokyo (JP)

(72) Inventors: Ichiro Yamakawa, Tokyo (JP); Kie Orihashi, Tokyo (JP); Hiroki Nakatsuchi, Tokyo (JP); Isamu Yoshida, Tokyo (JP); Masafumi Miyake, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 18 days.

(21) Appl. No.: 18/571,445

(22) PCT Filed: Jun. 15, 2022

(86) PCT No.: PCT/JP2022/023994
§ 371 (c)(1),
(2) Date: Dec. 18, 2023

(87) PCT Pub. No.: WO2023/013257
PCT Pub. Date: Feb. 9, 2023

(65) Prior Publication Data
US 2024/0288400 A1     Aug. 29, 2024

(30) Foreign Application Priority Data
Aug. 6, 2021    (JP) ................................. 2021-129449

(51) Int. Cl.
*G01N 27/333*     (2006.01)
*B01L 3/00*       (2006.01)
*G01N 27/403*     (2006.01)

(52) U.S. Cl.
CPC .......... *G01N 27/333* (2013.01); *B01L 3/5027* (2013.01); *B01L 3/565* (2013.01); *G01N 27/403* (2013.01)

(58) Field of Classification Search
CPC .. G01N 27/333; G01N 27/403; G01N 35/085; B01L 3/502715; B01L 3/565; B01L 2200/0689
See application file for complete search history.

(56) References Cited

U.S. PATENT DOCUMENTS 4,519,890 A * 5/1985 Uematsu ................ G01N 27/28
                                                    204/420
4,797,191 A * 1/1989 Metzner .............. A61M 1/3621
                                                    204/411
(Continued)

FOREIGN PATENT DOCUMENTS

CN          105829875 A      8/2016
JP          S62-86548 U      6/1987
(Continued)

OTHER PUBLICATIONS

English language translation of the Written Opinion for international application PCT/JP2022/023994, mailed Aug. 9, 2022 (Year: 2022).*

(Continued)

*Primary Examiner* — Alexander S Noguerola
(74) *Attorney, Agent, or Firm* — Foley & Lardner LLP

(57) ABSTRACT
An electrolyte measuring structure includes a housing and a sealing material. The electrolyte measuring structure being connectable to another electrolyte measuring structure via the sealing material. The housing includes a main body having a flow path therethrough and a fixing structure. The fixing structure includes a first protrusion having a first hole, a second protrusion, and a fixing recess. The sealing material includes a front surface and a back surface. The sheet region
(Continued)

has a second hole. In a state where the sealing material is fixed, a first protrusion amount is larger than a second protrusion amount. When viewed in a cross-section passing through a central axis of the second hole in a state where the sealing material is removed from the fixing structure, a first slope defined below is smaller than a second slope.

9 Claims, 14 Drawing Sheets

(56)             References Cited

U.S. PATENT DOCUMENTS

| 4,935,117 | A | | 6/1990 | Uematsu et al. | |
|---|---|---|---|---|---|
| 5,017,339 | A | * | 5/1991 | Marsoner | G01N 35/00 |
| | | | | | 204/411 |
| 5,513,859 | A | * | 5/1996 | Huber | F16J 15/028 |
| | | | | | 277/944 |

| 11,397,162 | B2 | | 7/2022 | Kishioka et al. |
|---|---|---|---|---|
| 2008/0060940 | A1 | | 3/2008 | Hongo et al. |
| 2016/0334358 | A1 | | 11/2016 | Kishioka et al. |

FOREIGN PATENT DOCUMENTS

| JP | H02-007560 U1 | 1/1990 |
|---|---|---|
| JP | H03-117755 U1 | 12/1991 |
| JP | 2008-096447 A | 4/2008 |
| WO | WO-2015/115303 A1 | 8/2015 |

OTHER PUBLICATIONS

International Search Report with English Translation and Written Opinion of International Patent Application No. PCT/JP2022/023994 dated Aug. 9, 2022 (9 pages).
Chinese Office Action issued in corresponding CN Application No. 202280043873.3 dated Mar. 30, 2026 with English translation (17 Pages).

* cited by examiner

[FIG. 1A]
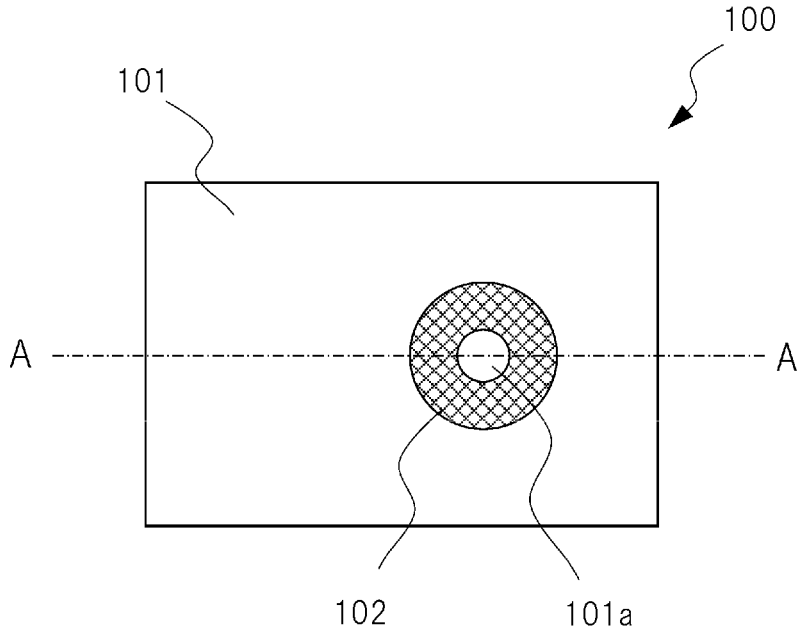
[FIG. 1B]
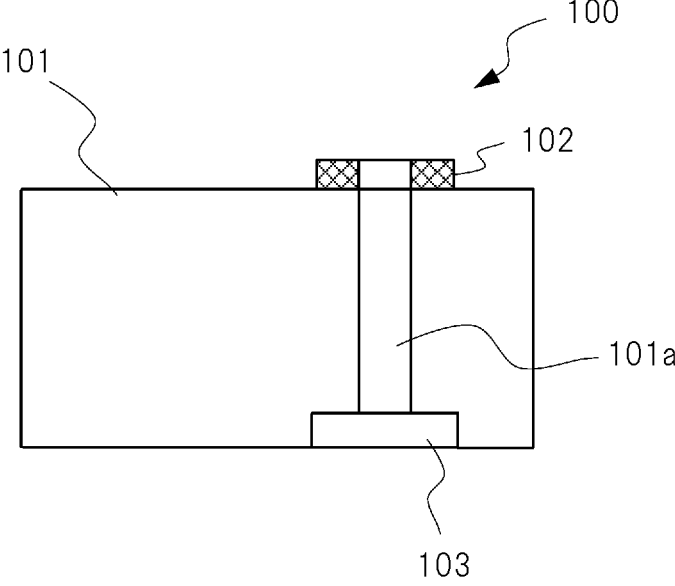

[FIG. 2A]
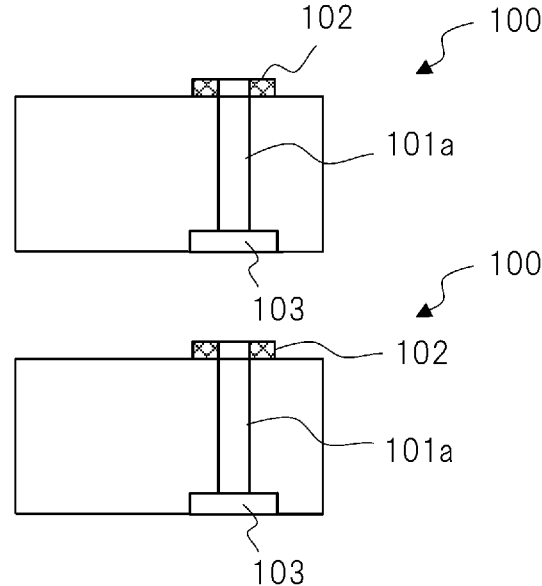
[FIG. 2B]
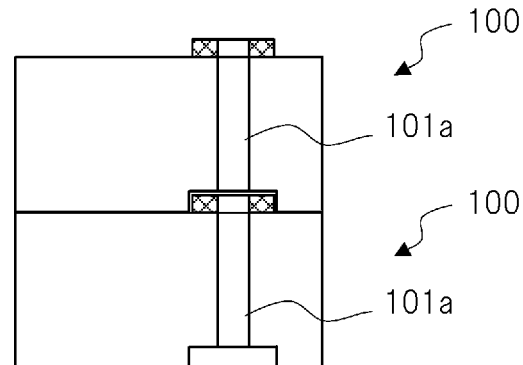

[FIG. 3]
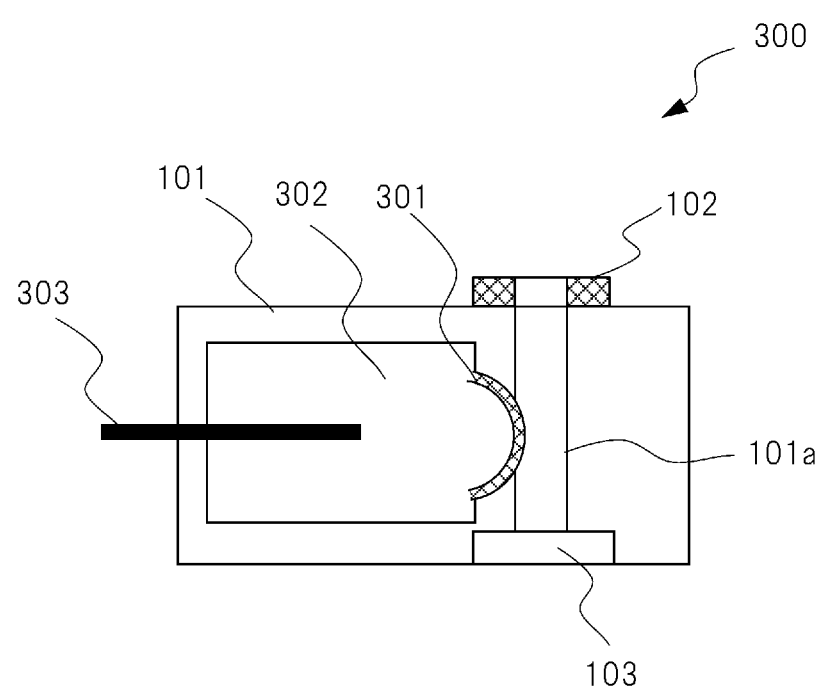

[FIG. 4A]
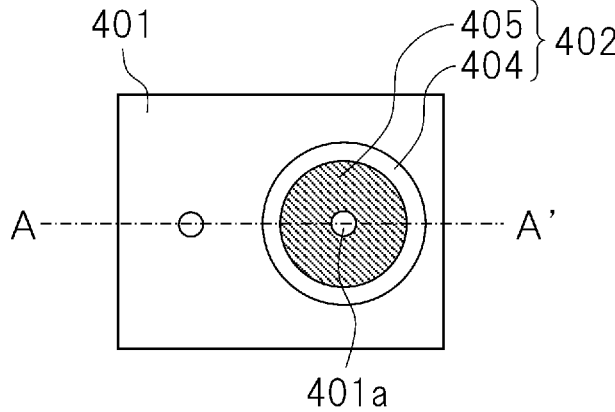
[FIG. 4B]
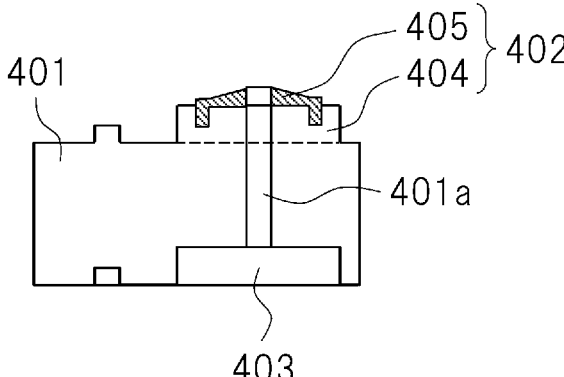

[FIG. 4C]
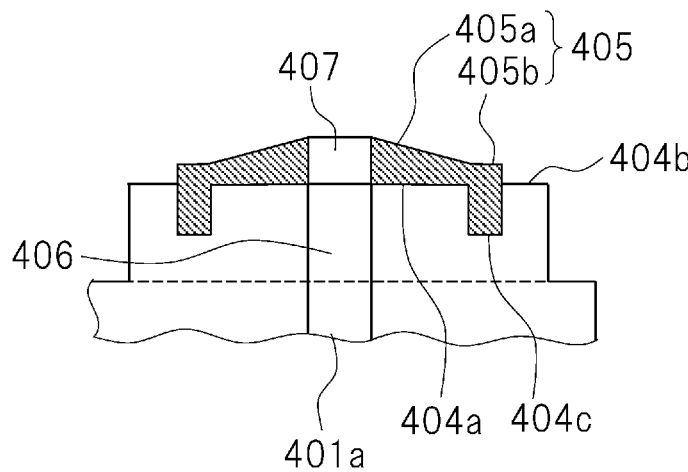
[FIG. 4D]
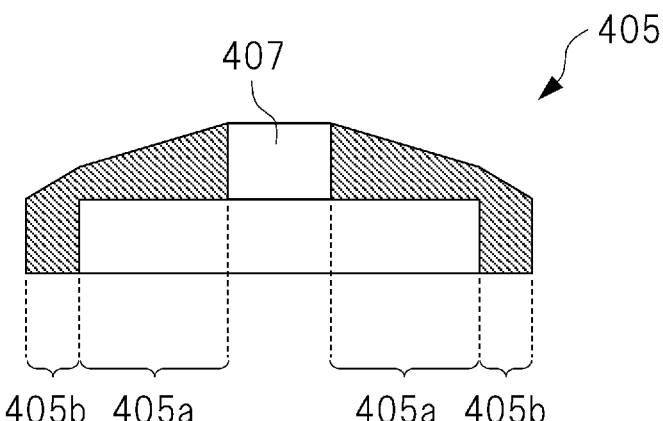

[FIG. 5]
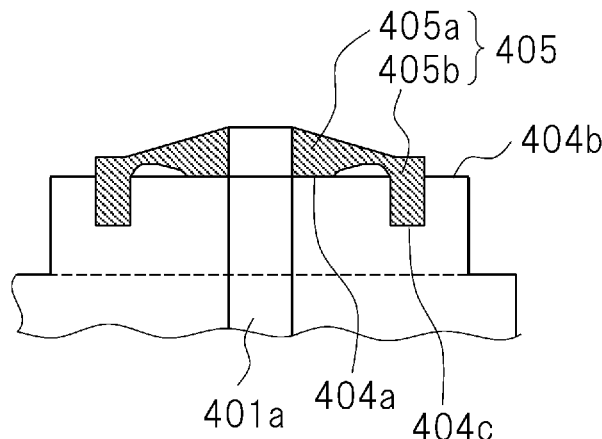
[FIG. 6]
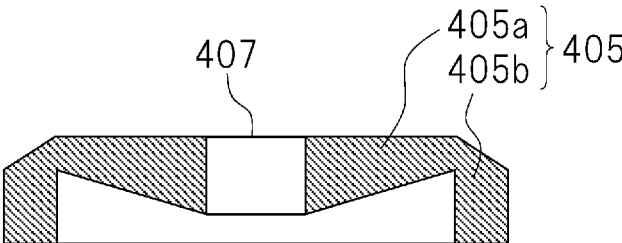

[FIG. 7]
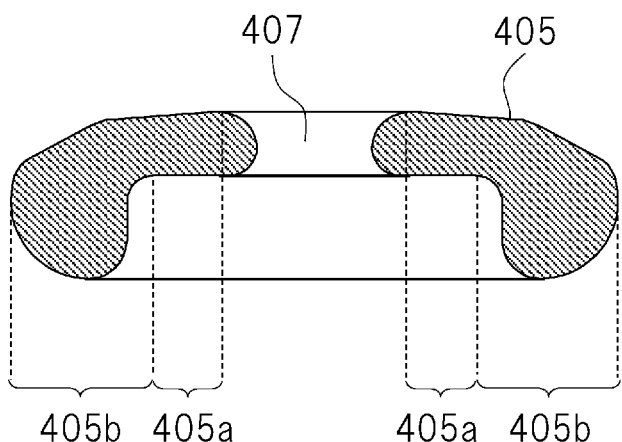

[FIG. 8]
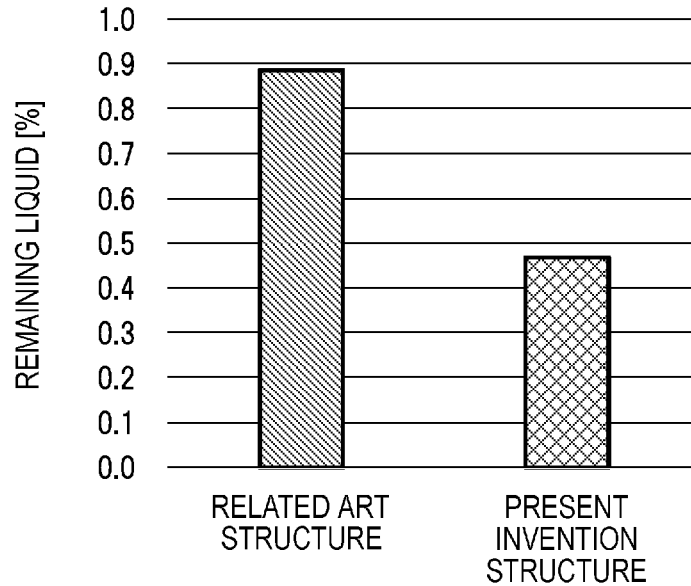
[FIG. 9]
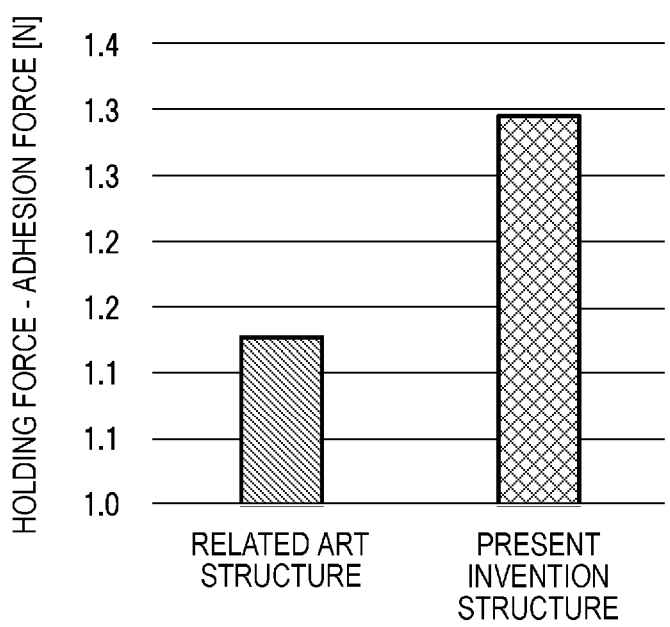

[FIG. 10]
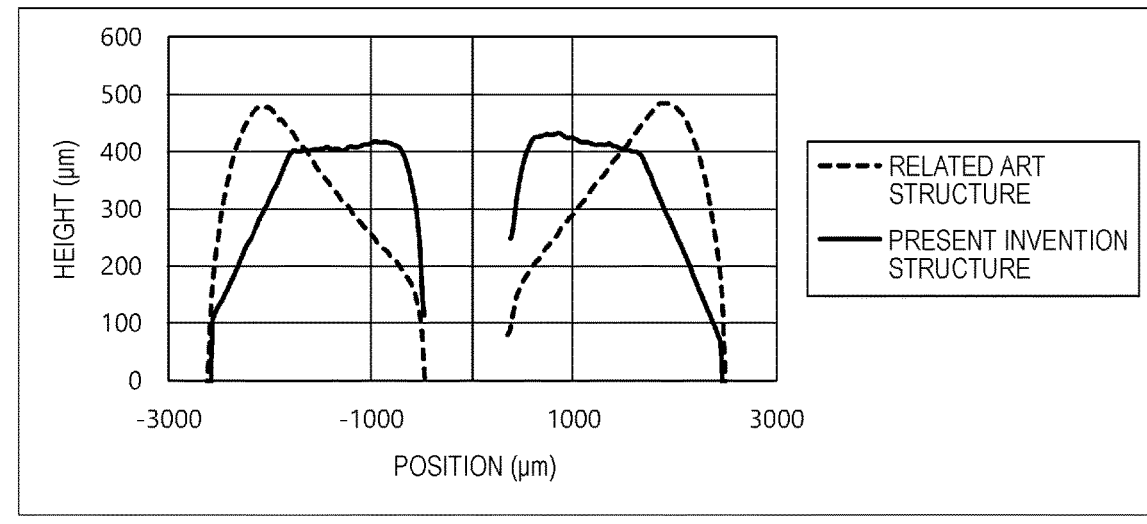
[FIG. 11]
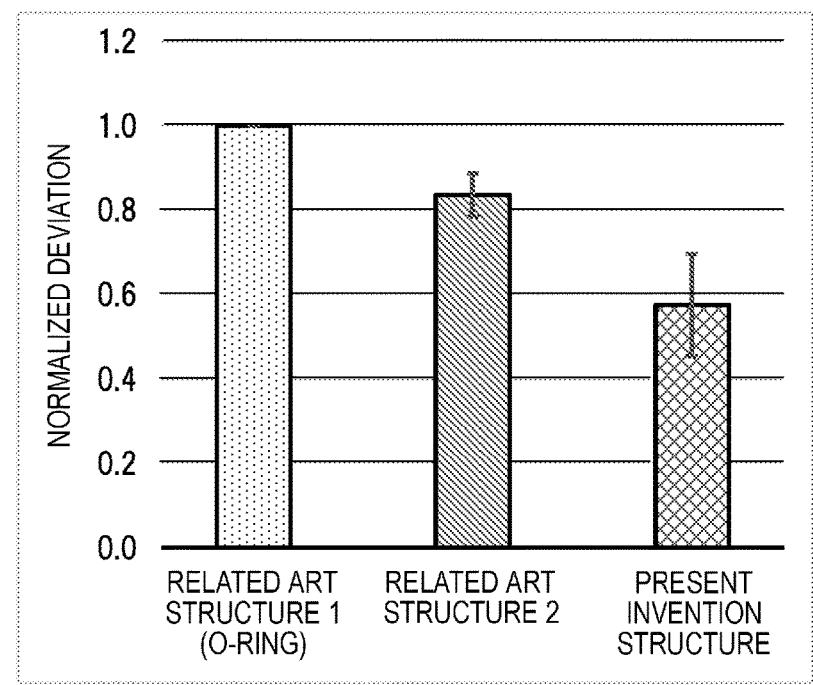

[FIG. 12]
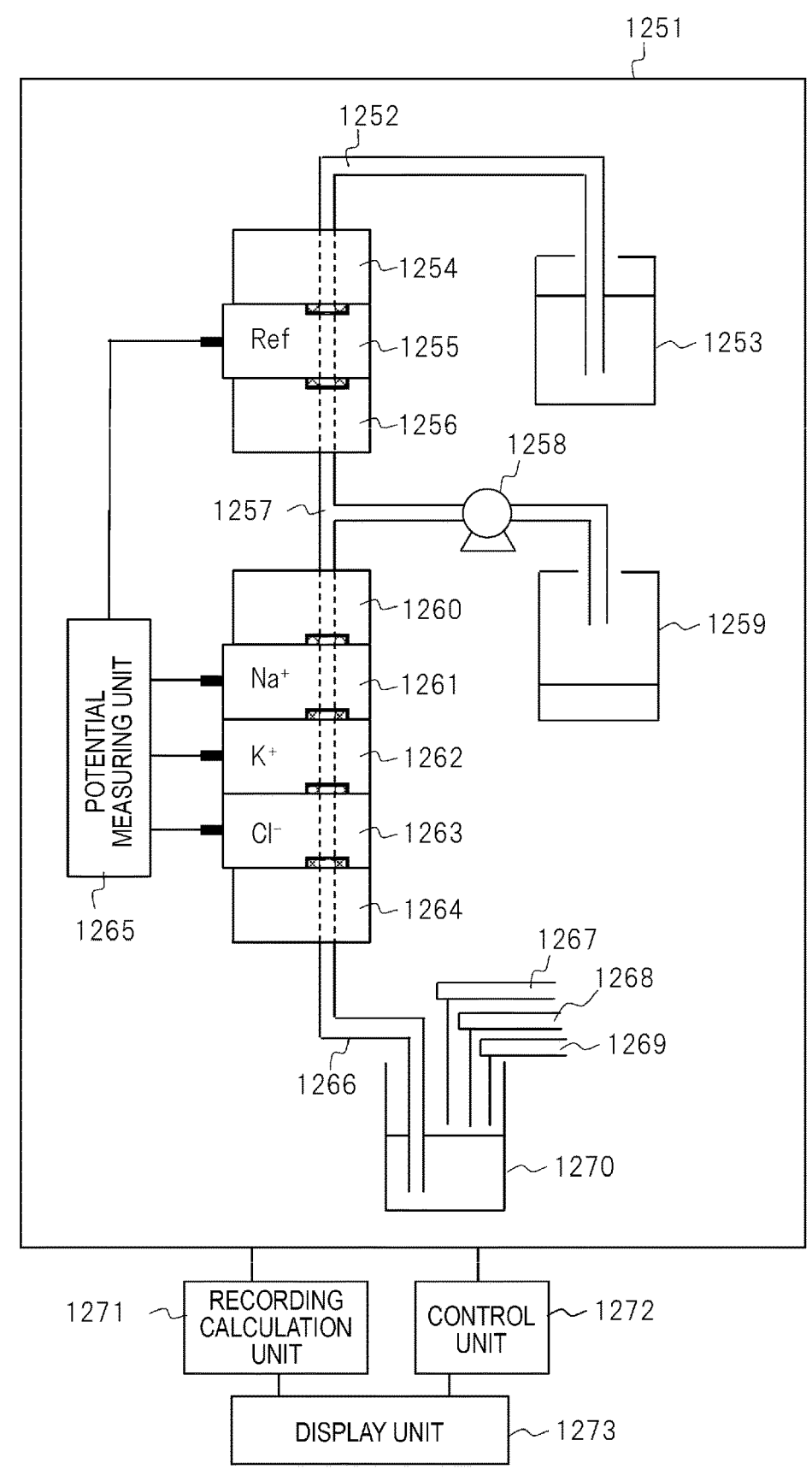

[FIG. 13A]
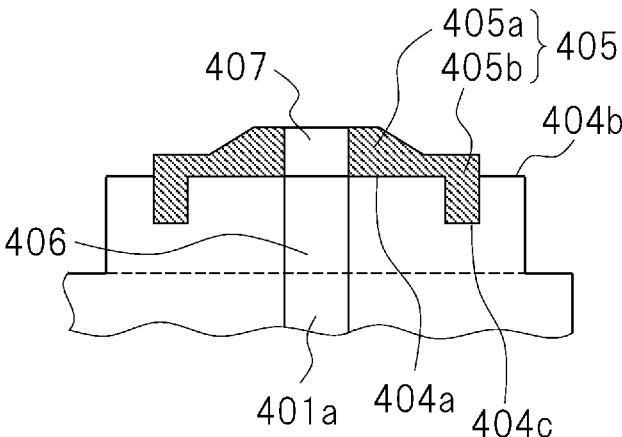
[FIG. 13B]
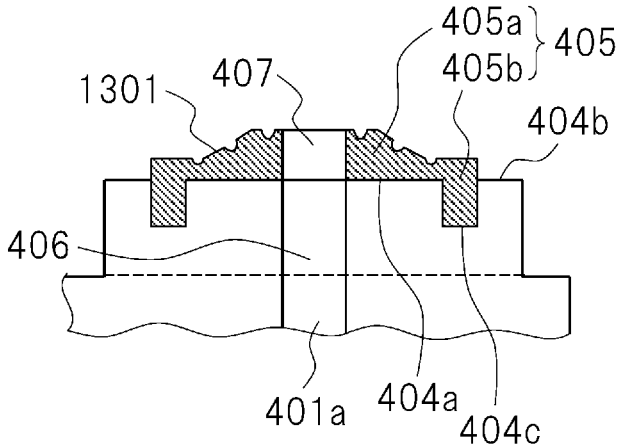

[FIG. 14]
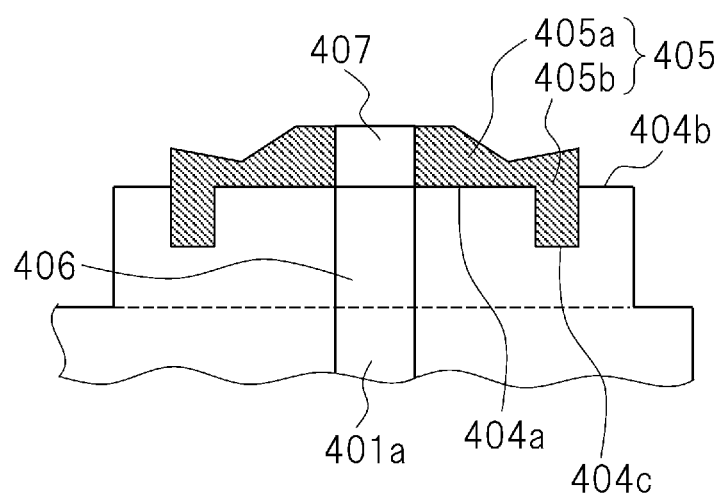

[FIG. 15]
Prior Art
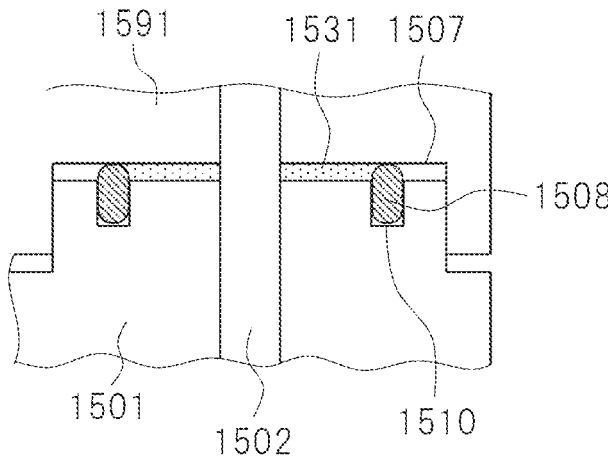
[FIG. 16]
Prior Art
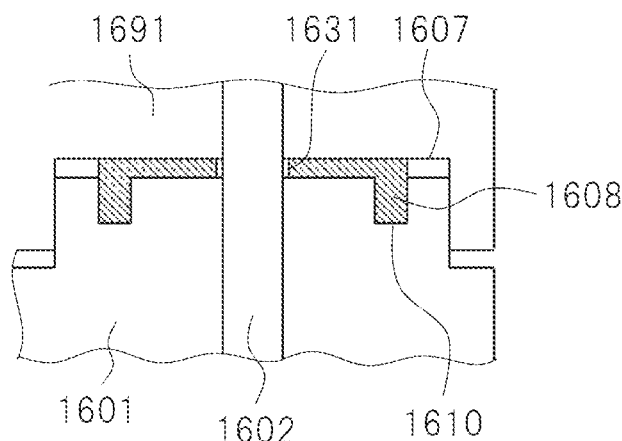

[FIG. 17]
Prior Art
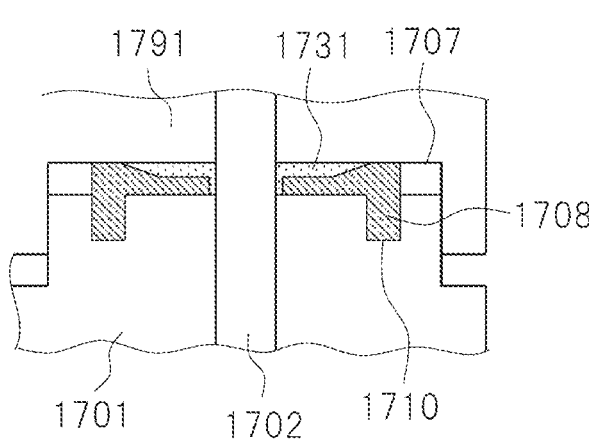

ELECTROLYTE MEASURING STRUCTURE, FLOW-TYPE ION-SELECTIVE ELECTRODE USING THE SAME, AND ELECTROLYTE MEASURING DEVICE

TECHNICAL FIELD

The present invention relates to an electrolyte measuring structure for measuring electrolyte concentration in a solution, a flow-type ion-selective electrode having the electrolyte measuring structure, and an electrolyte measuring device.

BACKGROUND ART

The ion-selective electrode is a device that can quantify the concentration of ions to be measured in a sample solution by measuring the potential difference between the electromotive force generated in an electrode of a detection unit when the sample solution is brought into contact with the detection unit, and the reference electrode.

Among the ion-selective electrodes, the flow-type ion-selective electrode has a built-in flow path through which the sample solution flows, and the detection unit is provided in the flow path. Therefore, by changing the sample solution flowing in the flow path, the concentration of the ion to be measured can be continuously measured.

Further, by connecting a plurality of the flow-type ion-selective electrodes having different ions to be measured, or by providing a plurality of the detection units for measuring different ions in the flow path in the electrode, it is possible to measure the concentration of each ion simultaneously for different ion species.

Due to such advantages, the flow-type ion-selective electrodes are used for clinical testing in the medical field, and are installed as electrolyte concentration measuring units not only in dedicated machines for measuring electrolyte concentration, but also in biochemical automatic analyzers. Since the ion-selective electrode in the electrolyte concentration measuring unit is generally a consumable item and has a lifespan of, for example, two to three months, the ion-selective electrode needs to be replaced with a new one every time a predetermined period of time elapses.

As a method for attaching the ion-selective electrode to the electrolyte concentration measuring unit, as disclosed in PTL 1, a method for stacking a plurality of ion-selective electrodes and using an O-ring on the connection portion between the respective flow paths is well known.

FIG. 15 is a schematic diagram illustrating an example of a related art structure of a flow path connection unit of an ion-selective electrode disclosed in PTL 1. The ion-selective electrode includes a flow path 1502 that penetrates a main body 1501 that forms a housing, and a connection structure is formed in a convex shape at one end of the flow path 1502. This connection structure is configured such that an O-ring 1508, which is a sealing material, is held in a fixing structure in which a concave portion 1510 is formed for fixing the sealing material.

This connection structure can be fitted to a flow path connection unit 1507 provided in another ion-selective electrode 1591 to connect a plurality of ion-selective electrode flow paths. In FIG. 15, two connected flow paths are illustrated as one body for convenience. Since the flow path 1502 and the O-ring 1508 are usually arranged at a certain distance, a gap 1531 is generated between the ion-selective electrodes. A part of the sample solution flowing through the flow path 1502 flows into the gap 1531 and is retained therein. When a plurality of samples are measured in sequence, the retained sample solution is gradually released into the flow path when the sample solution for the next measurement flows in.

In the case of such a structure, the retained sample solution is mixed with a sample solution to be originally measured, which may affect the measurement result. That is, when an amount of sample solution is large, there is little possibility of affecting the measurement result, but when the amount of sample solution is little, there is a possibility of affecting the measurement result and hindering accurate measurement.

In addition, the electrolyte concentration measuring unit consumes a small amount of the reagent per sample, but this consumption increases when the electrolyte concentration measuring unit operates continuously, and it is necessary to replace reagent bottles several times a day. Since replacing the reagent bottles leads to a decrease in the throughput of sample measurement due to re-start-up, there is a strong demand from users to reduce replacement work. When the amount of reagent solution is reduced, the ratio of a remaining liquid increases, so that the influence on the measured value increases.

As a technique for solving such problems, a technique for reducing the remaining liquid by using a sealing material having a flat sheet portion and a protrusion portion including a convex portion fixed to a concave portion of the ion-selective electrode to reduce the gap between the flow path and the sealing material, is disclosed in PTL 2.

FIG. 16 is a schematic diagram illustrating an example of a related art structure of a flow path connection unit of an ion-selective electrode disclosed in PTL 2. The ion-selective electrode includes a flow path 1602 that penetrates a main body 1601 that forms a housing, and a connection structure is formed in a convex shape at one end of the flow path 1602. This connection structure is configured such that a sealing material 1608 is held in a fixing structure in which a concave portion 1610 is formed for fixing the sealing material.

This connection structure can be fitted to a flow path connection unit 1607 provided in another ion-selective electrode 1691 to connect a plurality of ion-selective electrode flow paths. In FIG. 16, two connected flow paths are illustrated as one body for convenience. Here, the sealing material 1608 is formed with a flat sheet portion for sealing and a protrusion that is fitted into the concave portion 1610 for fixing. With such a structure, the sealing material 1608 seals up to the vicinity of the flow path, and the volume of a gap 1631 between the flow path and the sealing material can be made very small, so that a retained amount of a part of the sample solution flowing through the flow path 1602 can be effectively reduced.

CITATION LIST

Patent Literature

PTL 1: JPS62-86548A
PTL 2: WO 2015/115303

SUMMARY OF INVENTION

Technical Problem

However, such ion-selective electrodes need to be replaced with new ones every time a predetermined period of time elapses, as described above. In the case of this structure, it was found that the sealing material 1608 may stick to the ion-selective electrode 1691 side and fall off when the ion-selective electrodes are pulled apart from each other during electrode replacement.

This is considered to be due to the fact that the contact area between the sealing material 1608 and the ion-selective electrode housing 1691 to be connected increases, and the sealing material and the ion-selective electrode housing to be connected are stuck together during the usage period of about 2 to 3 months. When such a fall-off occurs, the replacement work becomes complicated.

Therefore, the present inventors have considered that, in contrast to the technique of PTL 2, the width of the protrusion portion of the sealing material is made larger than the width of the concave portion for fixing in order to reliably hold the sealing material to the ion-selective electrode, thereby improving the fixing force in the fixing structure.

FIG. 17 illustrates an example of a flow path connection unit when the structure of the sealing material is changed so as to reliably hold the sealing material to the ion-selective electrode to be fixed. The ion-selective electrode includes a flow path 1702 that penetrates a main body 1701 that forms a housing, and a connection structure is formed in a convex shape at one end of the flow path 1702. This connection structure is configured such that a sealing material 1708 is held in a fixing structure in which a concave portion 1710 is formed for fixing the sealing material.

This connection structure can be fitted to a flow path connection unit 1707 that is provided in another ion-selective electrode 1791 to connect a plurality of ion-selective electrode flow paths. In FIG. 17, two connected flow paths are illustrated as one body for convenience. Here, the sealing material 1708 is formed with a flat sheet portion for sealing and a protrusion that is fitted into the concave portion 1710 for fixing. In order to reliably hold the sealing material 1708 in the fixing structure, the sealing material 1708 has a structure in which the width of the protrusion of the sealing material 1708 is larger than the width of the concave portion 1710, in contrast to the sealing material 1608 in FIG. 16.

However, in this case, when the protrusion of the sealing material 1708 is fitted into the concave portion 1710, the protrusion portion is crushed, so that the upper part of the protrusion portion of the sealing material 1708 (peripheral region of the sealing material) has a raised structure. Therefore, a gap 1731 between another ion-selective electrode connected to the flow path and the sealing material increases, and there is a concern that the problem of the remaining liquid, which has been solved in PTL 2, recurs and affects the measurement result.

Solution to Problem

In order to solve the above problems, an electrolyte measuring structure according to an example of the invention includes a housing and sealing material, and is connectable to another electrolyte measuring structure via the sealing material. The housing includes a main body having a flow path therethrough and a fixing structure for fixing the sealing material to the main body, in which the fixing structure includes a first protrusion having a first hole connected to the flow path, a second protrusion formed on an outer periphery of the first protrusion, and a fixing recess for detachably fixing the sealing material formed by the first protrusion and the second protrusion. The sealing material includes a front surface designed to be in contact with the other electrolyte measuring structure and a back surface designed to be in contact with the fixing structure, and is an elastic body in which a sheet region that is a sheet-like region, and a protrusion region that is a protrusion provided on an outer peripheral side surface of the sheet region and sandwiched between the fixing recess are integrally molded. The sheet region has a second hole arranged at a position corresponding to the first hole in a state where the sealing material is fixed to the fixing structure. In a state where the sealing material is fixed to the fixing structure and is not in contact with the other electrolyte measuring structure, a first protrusion amount defined below is larger than a second protrusion amount: the first protrusion amount is a protrusion amount of a first portion that protrudes the most on a front surface of the sheet region, and the second protrusion amount is a protrusion amount of a second portion that protrudes the most on a front surface of the protrusion region.

Further, a flow-type ion-selective electrode and an electrolyte measuring device according to an example of the invention include the above-described electrolyte measuring structure.

Advantageous Effects of Invention

According to an embodiment of the invention, when the connected electrolyte measuring structures are pulled apart from each other, the adhesion between a sealing material and another electrolyte measuring structure is reduced, and thus, the sealing material can be prevented from falling off during electrode replacement and a gap where a sample solution is retained during connection (measurement) can be effectively reduced. As a result, the influence of the retention of the sample solution on a measured value can be reduced, accurate measurement can be performed, and electrode replacement work can be performed smoothly.

BRIEF DESCRIPTION OF DRAWINGS

FIG. 1A is a schematic diagram illustrating a configuration example of an electrolyte measuring structure.

FIG. 1B is a cross-sectional view of the electrolyte measuring structure illustrated in FIG. 1A.

FIG. 2A is a schematic diagram illustrating an example of connection of the electrolyte measuring structure.

FIG. 2B is a schematic diagram illustrating an example of connection of the electrolyte measuring structure.

FIG. 3 is a schematic diagram illustrating a configuration example of an ion-selective electrode.

FIG. 4A is a schematic diagram illustrating another configuration example of the electrolyte measuring structure.

FIG. 4B is a cross-sectional view of the electrolyte measuring structure illustrated in FIG. 4A.

FIG. 4C is an enlarged view of a flow path connection unit of the electrolyte measuring structure illustrated in FIG. 4A.

FIG. 4D is a cross-sectional view when a sealing member of FIG. 4A is removed from the electrolyte measuring structure.

FIG. 5 is an enlarged view of a flow path connection unit of another electrolyte measuring structure.

FIG. 6 is a cross-sectional view when another sealing member is removed from the electrolyte measuring structure.

FIG. 7 is a cross-sectional view when yet another sealing member is removed from the electrolyte measuring structure.

FIG. 8 is a diagram illustrating results of calculating a remaining liquid amount by simulation.

FIG. 9 is a diagram illustrating one result of measuring a holding force and an adhesion force of a sealing material.

FIG. 10 is a diagram illustrating one result of measuring a surface uneven shape with the sealing material attached to an ion-selective electrode housing.

FIG. 11 is a diagram illustrating one result of an electrolyte concentration measurement deviation confirmation experiment.

FIG. 12 is a schematic diagram illustrating a configuration example of an electrolyte measuring device.

FIG. 13A is a schematic diagram illustrating a modification of the flow path connection unit.

FIG. 13B is schematic diagram a illustrating a modification of the flow path connection unit.

FIG. 14 is a schematic diagram illustrating a modification of the flow path connection unit.

FIG. 15 is a schematic diagram illustrating an example of a flow path connection unit of a related art ion-selective electrode.

FIG. 16 is a schematic diagram illustrating another example of the flow path connection unit of the related art ion-selective electrode.

FIG. 17 is a schematic diagram illustrating a modification of the flow path connection unit of the related art ion-selective electrode.

DESCRIPTION OF EMBODIMENTS

Hereinafter, one embodiment of the invention will be described with reference to the drawings. Note that some hatchings in the drawings are used for illustration and do not necessarily indicate a cross section. Further, even in the cross-sectional view, cross-sectional hatching may be omitted.

FIGS. 1A and 1B are schematic diagrams illustrating a configuration example of an electrolyte measuring structure.

An electrolyte measuring structure 100 shown here includes a plastic main body 101 having a flow path 101*a* therethrough and a flow path connection unit 102 for connecting the flow path 101*a* and a flow path of another electrolyte measuring structure. Here, FIG. 1A is the schematic diagram illustrating a surface (surface on the flow path connection unit 102 side) viewed from an axial direction of the flow path, and FIG. 1B is the schematic diagram illustrating a cross section taken along chain line A-A' (surface parallel to the flow path) of FIG. 1A.

The flow path connection unit 102 is provided in a convex shape at one end of the flow path 101*a*, for example, and the other end of the flow path 101*a* is provided with a concave flow path connection unit 103 so as to be fitted to the flow path connection unit 102. Here, the flow path connection unit 102 is configured with a sealing material and a fixing structure for fixing the sealing material, and these structures will be described in detail below.

Since such a flow path connection unit is provided, when the electrolyte measuring structures having the same structure are prepared, the flow path connection units thereof can be connected. The operation of the connection will be described with reference to FIGS. 2A and 2B. FIG. 2A is a diagram illustrating a state of the electrolyte measuring structure before connection. First, two electrolyte measuring structures 100 are prepared, and the flow path connection unit 102 of one electrolyte measuring structure 100 and the flow path connection unit 103 of another electrolyte measuring structure 100 are arranged facing each other.

Then, the electrolyte measuring structures 100 are brought closer to each other, and as illustrated in FIG. 2B, the flow path connection unit 102 is fitted to the flow path connection unit 103 and pressed. Then, the two electrolyte measuring structures 100 are fixed in a predetermined arrangement, and the respective flow paths 101*a* are connected to each other. At this time, as will be described later, the flow path connection unit 102 and the flow path connection unit 103 are connected to each other via a sealing material and a sample solution can be prevented from leaking to the outside when the sample solution for measurement flows from one flow path 101*a* to the other flow path 101*a*. The flow path connection unit 103 may not be provided when used for the flow path connection structures 1256 and 1264 of FIG. 12 described later.

In addition, FIG. 3 is a schematic diagram illustrating a configuration example of an ion-selective electrode using the electrolyte measuring structure 100 illustrated in FIGS. 1A and 1B. FIG. 3 is the diagram when viewed with a cross-section corresponding to FIG. 1B.

As illustrated in FIG. 3, in an ion-selective electrode 300, a sensitive membrane 301 serving as a detection unit is in contact with the flow path 101*a*. An internal liquid 302 is filled on the side opposite to the flow path 101*a* as seen from the sensitive membrane 301, and an electrode 303 is in contact with the internal liquid 302. The electrode 303 is made, for example, of a silver/silver chloride electrode.

When the sensitive membrane 301 is a cation-selective electrode such as sodium or potassium, a membrane having cation-selective permeability, for example, a membrane containing ionophore such as crown ether, can be used. When the sensitive membrane 301 is an anion-selective electrode such as chlorine or carbonic acid, in addition to a membrane containing ionophore, a membrane having anion-selective permeability, for example, silver halide such as silver chloride or silver bromide, or an ion exchange membrane, can be used. Further, when the sensitive membrane 301 is used as a reference electrode, porous glass, ceramic, or the like can be used. Although the sensitive membrane 301 has been described above, a known membrane material can be used and is not limited to these.

Next, the flow path connection unit described above will be described in detail below.

FIGS. 4A to 4D are schematic diagrams of the electrolyte measuring structure illustrating a more specific configuration of the flow path connection unit, and FIGS. 4C and 4D particularly illustrate an example of a configuration of the sealing material.

Here, FIGS. 4A and 4B are the schematic diagrams of the electrolyte measuring structure illustrating a surface (surface on the flow path connection unit 402 side) viewed from an axial direction of the flow path, and a cross section taken along chain line A-A' (surface parallel to the flow path) of FIG. 4A, respectively. Also, FIG. 4C is the schematic diagram illustrating an enlarged structure of the flow path connection unit 402, and FIG. 4D is the schematic diagram illustrating a cross-sectional shape of the sealing material when the sealing material is removed from the electrolyte measuring structure.

The electrolyte measuring structure illustrated here includes a plastic main body 401 having a flow path 401*a* therethrough, a flow path connection unit 402 formed at one end of the flow path 401*a*, and a flow path connection unit 403 formed at the other end of the flow path 401*a*. In addition, the flow path connection unit 402 is configured with a fixing structure 404 and a sealing material 405. In order to describe the fixing structure 404 provided in the main body 401, in FIGS. 4B and 4C, a boundary between the main body 401 and the fixing structure 404 is indicated with a dashed line for convenience. However, the main body 401 and the fixing structure 404 may be formed either integrally or separately, which is also referred to as a housing of the electrolyte measuring structure. In this case, the sealing material 405 is attached to the housing to form the electrolyte measuring structure.

The main body 401 of this electrolyte measuring structure includes the flow path 401a therethrough. The flow path 401a is a flow path through which the sample solution for measurement passes, and is formed as a through hole in the main body 401. Further, the main body 401 may further include alignment protrusions other than the flow path connection units 402 and 403.

The one end of the flow path 401a is provided with the flow path connection unit 402 for connecting the flow path 401a and a flow path of another electrolyte measuring structure, and the other end of the flow path 401a is provided with the flow path connection unit 403 for connecting the flow path 401a and a flow path of still another electrolyte measuring structure.

The flow path connection unit 402 is provided in a convex shape configured with the fixing structure 404 and the sealing material 405 at the one end of the flow path 401a, for example, and the flow path connection unit 403 is provided in a concave shape so that the flow path connection unit 402 is fitted to the other end of the flow path 401a.

Here, as illustrated in FIG. 4C, the fixing structure 404 includes a first protrusion 404a having a first hole 406 connected to the flow path 401a and a second protrusion 404b formed on an outer periphery of the first protrusion 404a. Then, the first protrusion 404a and the second protrusion 404b form a fixing recess 404c for detachably fixing the sealing material 405. That is, a protrusion portion of the sealing material 405 is fixed with the protrusion portion sandwiched between a side surface of the first protrusion 404a and a side surface of the second protrusion 404b. In the first hole 406, all or part of the hole is connected to the flow path 401a, and the sample solution may be able to pass through.

The sealing material 405 is formed of a softer material than the housing of the electrolyte measuring structure such as an elastic body, and is a member that can be detached from the housing (fixing structure 404). The sealing material 405 includes a front surface designed to be in contact with the other electrolyte measuring structure (upper surface in the drawings illustrated in FIGS. 4C and 4D) and a back surface designed to be in contact with the fixing structure 404 (first protrusion 404a).

That is, the front surface of the sealing material 405 is a surface that is in contact with another electrolyte measuring structure when the housing and the other electrolyte measuring structure are connected to each other. The back surface of the sealing material 405 is a surface that is in contact with the fixing structure of the electrolyte measuring structure. Therefore, when connecting a plurality of the electrolyte measuring structures, the front surface of the sealing material 405 is in contact with and pressed to the other electrolyte measuring structure and the back surface of the sealing material 405 is in contact with and pressed to the fixing structure 404, thereby making it possible to prevent the sample solution passing through the flow path 401a from leaking to the outside.

The sealing material 405 is formed in which a sheet region 405a that is a sheet-like region, and a protrusion-shaped protrusion region 405b provided on an outer peripheral side surface of the sheet region 405a and sandwiched between the fixing recess 404c are integrally molded.

The sheet region 405a is a portion that covers the inside (flow path 401a side) of the fixing recess 404c of the fixing structure 404, and includes the second hole 407 arranged at a position corresponding to the first hole 406 in a state where the sealing material 405 is fixed to the fixing structure 404. The second hole 407 may be provided at a position where all or part of the hole is connected to the first hole 406 and the sample solution can pass therethrough when the second hole 407 is fixed to the fixing structure 404.

The protrusion region 405b is provided at a position corresponding to the fixing recess 404c of the fixing structure 404, and is formed protruding from the sheet region so as to be sandwiched between the fixing recess 404c on the outer peripheral side surface of the sheet region 405a. The sealing material 405 is preferably pressed and fixed to the fixing recess 404c as described above. In this case, the width of the protrusion region 405b of the sealing material 405 may be formed so as to be larger than the width of the fixing recess 404c. In this way, the protrusion region 405b is pressed and fixed to the side surface of the first protrusion 404a and the side surface of the second protrusion 404b, and the fixing force can be kept high.

In a state where the sealing material 405 is fixed to the fixing structure 404 and is not in contact with the other electrolyte measuring structure, a first protrusion amount defined below is larger than a second protrusion amount. Here, the first protrusion amount is a protrusion amount of a first portion when a portion that protrudes the most on a front surface of the sheet region 405a is the first portion, and the second protrusion amount is a protrusion amount of a second portion when a portion that protrudes the most on a front surface of the protrusion region 405b is the second portion.

These protrusion amounts can also be referred to as protrusion amounts in a detaching direction when detaching the plurality of electrolyte measuring structures, and are preferably, for example, protrusion amounts in a direction along a central axis of the first hole 406 of the fixing structure 404.

More specifically, on the surface (front surface) of the sealing material 405 in contact with the other electrolyte measuring structure, when a protrusion surface of the fixing structure (upper surface of the first protrusion 404a in FIG. 4C) is a reference surface, a vertical distance from the reference surface is the protrusion amount. Further, a portion having the largest protrusion amount on the front surface of the sheet region 405a is the first portion, and a portion having the largest protrusion amount on the front surface of the protrusion region 405b is the second portion. At this time, the sealing material is formed so that a protrusion amount of the first portion is larger than the protrusion amount of the second portion.

The sealing material 405 illustrated in FIGS. 4A to 4D is an example where the first portion is a portion of the sheet region 405a adjacent to the second hole 407, and the second portion is the entire region of the protrusion region 405b (the same protrusion amount). At this time, the protrusion amount of the first portion is larger than the protrusion amount of the second portion, and when the sealing material 405 and the other electrolyte measuring structure are connected to each other, the first portion is reliably sealed, and the second portion is not in contact with the other electrolyte measuring structure, or even when the second portion is in contact with the other electrolyte measuring structure, the pressure is weak.

Therefore, when the electrolyte measuring structures are pulled apart from each other from the connected state, the front surface of the sealing material (particularly, the front surface of the sheet region 405a) in contact with a housing of the other electrolyte measuring structure is separated from the protrusion region 405*b* side, thereby preventing the sealing material 405 and the other electrolyte measuring structure from sticking together.

In the sheet region 405*a* of the sealing material 405, the relationship with the above-mentioned protrusion amounts is such that an average thickness decreases from the second hole 407 side to an outer periphery of the sheet region 405*a*, and the above-mentioned protrusion amounts and the thicknesses have approximately the same relationship. The average thickness in the present specification means an average value of the thickness in a circumferential direction formed at the same distance about the second hole of the sealing material 405.

At this time, based on the second hole 407, a protrusion amount of a portion farther than the first portion of the sheet region 405*a* (portion on the outer peripheral side) is preferably smaller than the protrusion amount of the first portion. By doing this way, a contact area with another electrolyte measuring structure can be reduced and sticking can be further prevented. Further, it is more preferable that the first portion is provided in a portion adjacent to the second hole 407, and in this case, a contact area with still another electrolyte measuring structure can be further reduced to further prevent sticking.

As illustrated in FIG. 4D, an example is illustrated in which when the sealing material 405 is removed from the electrolyte measuring structure (fixing structure 404), a shape of the protrusion region 405*b* (upper part of the protrusion region) provided on the outer periphery of the sheet region 405*a* changes. In the present specification, a portion where the shape changes (portion where the shoulder is dropped) is referred to as a "peripheral region" of the sealing material 405.

That is, on the front surface of the sealing material in the peripheral region in FIG. 4D, an average slope (protrusion amount fluctuation ratio) on the front surface of the sheet region 405*a* is smaller than an average slope (protrusion amount fluctuation ratio) on the front surface of the protrusion region 405*b*. That is, an inclination of the protrusion region 405*b* is larger than an inclination of the sheet region 405*a*.

For example, in the sheet region 405*a*, when a contact surface with the first protrusion (back surface of the sheet region 405*a*) when fixed to the fixing structure is a horizontal plane, this inclination can be expressed as an inclination angle with respect to the horizontal plane, and is preferably 2 to 10 degrees. Further, the inclination angle of the protrusion region 405*b* is preferably 20 to 40 degrees with respect to the horizontal plane.

Thus, in FIG. 4D, a peripheral region of the protrusion region 405*b* is depressed, but when the protrusion region 405*b* is fixed to the electrolyte measuring structure (fixing structure 404), the protrusion region 405*b* is preferably formed so as to be pressed by the fixing recess 404*c*. Therefore, the protrusion region 405*b* is elastically deformed and raised by the pressure, and as illustrated in FIG. 4C, the protrusion amount in the protrusion region 405*b* is almost equal in the entire region of the protrusion region 405*b*. This example is an example, and as described above, the protrusion amount of the protrusion region 405*b* may fluctuate in any manner as long as the relationship is maintained in which the protrusion amount of the second portion is smaller than the protrusion amount of the first portion of the sheet region 405*a*.

Further, the relationship with the average slope may be either satisfied or not satisfied in the present embodiment, but when satisfied, an increase in the protrusion amount of the front surface of the protrusion region 405*b* (peripheral region of the sealing material 405) when the sealing material 405 is attached can be prevented, which is preferable.

In the sheet region 405*a*, as illustrated in FIG. 4D, it is preferable that the average thickness and the average protrusion amount are gradually reduced from the first portion having the largest protrusion amount to a connection portion of the protrusion region. At this time, when pulling apart the electrolyte measuring structures from each other, the separation force during which the peripheral sides of the sheet region 405*a* are separated works efficiently. On the other hand, since the thickness becomes thinner and the protrusion becomes smaller toward the periphery, separation is performed quickly, and it is less likely to stick to and be taken away by another electrolyte measuring structure.

Furthermore, in FIG. 4C, the sheet unit 312 and the first protrusion 309 are in close contact with each other, but do not necessarily need to be in close contact with each other. As illustrated in FIG. 5, even if the sheet region 405*a* is deformed and a space is created between the sheet region 405*a* and the first protrusion 404*a* when the protrusion region 405*b* is fixed to the fixing recess 404*c*, retention of the sample solution passing through the flow path 401*a* can be effectively reduced as long as the sheet region 405*a* and the first protrusion 404*a* are in contact with each other in the portion close to the flow path 401*a*.

As the sealing material 405, the average thickness is not limited if the average thickness is adjusted according to the electrolyte measuring structure to be used, but for example, a case can be exemplified in which a thickness of a connection portion between the sheet region 405*a* and the protrusion region 405*b* is 0.1 to 0.5 mm, a thickness of the portion of the sheet region 405*a* adjacent to the second hole 407 is 0.2 to 0.6 mm (however, it is assumed to be 0.05 mm or thicker than the thickness of the connection portion between the sheet region 405*a* and the protrusion region 405*b*), and the width of fitting the protrusion region 405*b* into the fixing recess is 1.0 to 1.2 mm.

More specifically, a case can be exemplified in which the thickness of the connection portion (boundary) between the sheet region 405*a* and the protrusion region 405*b* is 0.4 mm, and the thickness of the portion of the sheet region 405*a* adjacent to the second hole 407 is 0.5 mm. At this time, in the peripheral region of the protrusion region 405*b*, it is preferable to have a structure in which the shoulders are dropped so that the front surface does not protrude above the front surface of the sheet region 405*a*.

In FIGS. 4A to 4D, the fixing structure 404 is a cylindrical convex portion, and the sealing material 405 has a shape in which an annular protrusion region is integrally molded on an outer peripheral side surface of the disk-shaped sheet region, but the shape is not limited to these shapes. However, from the viewpoint of sealing performance and ease of manufacture and handling, the sealing material 405 preferably has a basic shape of a circular shape as illustrated in FIGS. 4A to 4D.

As another structure, as illustrated in FIG. 6, an example is illustrated in which the front surface of the sealing material 405 is flat without having a slope in the sheet region 405*a* and the back surface of the sealing material 405 is formed to have a slope in a state where the sealing material 405 is removed from the electrolyte measuring structure. In FIG. 6, an average thickness of the sheet region 405*a* fluctuates in the same way as the sealing material 405 illustrated in FIG. 4D, and on the back surface of the sealing material 405, the closer the sheet region 405*a* is to the second hole 407, the more the sheet region 405*a* protrudes toward the fixing structure 404 side. When the sealing material 405 of FIG. 6 is attached to the housing, the structure is the same as the electrolyte measuring structure illustrated in FIG. 4C.

Further, the sealing material 405 is configured with an elastic body as described above, and is formed of a material that is softer than the housing of the electrolyte measuring structure. By the way, when the sealing material 405 is too soft, the protrusion region 405*b* is difficult to be fixed by the fixing recess 404*c*, and when the sealing material 405 is too hard, the protrusion region 405*b* is not fitted into the fixing recess 404*c*. Therefore, as a material of the sealing material 405, the rubber hardness is preferably 60 to 80.

When the sealing material 405 is configured with an elastic body, it is preferable that the front surface is actually formed having a smooth curvature as illustrated in FIG. 7, from the manufacturing viewpoint. When forming the sealing material with such a curvature, it is preferable that the portion including all the regions through which the sample solution passes and extending in an axial direction of the second hole is regarded as the second hole 407. That is, when the inner surface of the second hole 407 of the sealing member has a shape that projects in a direction of the center of the second hole, the projecting portion is included in the second hole.

At this time, the first portion is arranged at a position adjacent to the second hole, and the first portion that is the last to be separated is the smallest and is located closest to the center of the sealing material 405. Therefore, when the plurality of electrolyte measuring structures are disconnected while reducing the retained sample solution, it is possible to further significantly prevent the sealing material from sticking to and being taken away by another electrolyte measuring structure.

Also, in FIG. 7, the boundary between the sheet region 405*a* and the protrusion region 405*b* is a portion serving as a starting point for forming the protrusion region 405*b* (starting point that changes from the flat surface of the sheet region with a curvature in preparation for forming the protrusion region on the back surface of the sheet member).

With the configuration described above, when the plurality of electrolyte measuring structures are disconnected while reducing the retained sample solution, it is possible to prevent the sealing material from sticking to and being taken away by another electrolyte measuring structure. In addition, this phenomenon of being taken away is considered to occur when acting like a suction cup at the time of disconnection, due to, for example, an adhesive strength of the sealing material, an adhesive strength generated by drying the sample solution, or the fact that the sample solution acts as a sealant between the sealing material and the other electrolyte measuring structure. In particular, it is considered that the adhesive strength of the sealing material is a weak bond due to secondary bonds (physical interactions such as hydrogen bonds and van der Waals forces) caused by the polymers that configure the sealing material diffusing and adsorbing to the adhesive interface at the initial stage of contact between the sealing material and the electrolyte measuring structure, but thereafter, develops into a stronger adhesion by the formation of primary bonds (chemical interactions) with lapse of time.

In the present embodiment, as an action to reduce the phenomenon of being taken away, at the time of disconnection, the protrusion region having a small protrusion amount is first firmly fixed by the fixing recess, so that the distance from the other electrolyte measuring structure is increased and separated before the sheet region (while the sealing material is elastically deformed), and then the sheet region is separated. Therefore, a large force does not act as compared with the case where the surfaces of the sealing material are separated at once, as in PTL 2 of the related art. In addition, since the separation is performed from the outside first and outside air enters, the action like a suction cup can be reduced.

As illustrated in FIG. 3, the electrolyte measuring structure described above can be an ion-selective electrode by providing a sensitive membrane, an internal liquid, and an electrode.

FIG. 8 shows the results of calculating a ratio of a remaining liquid, that is, a ratio of the volume of the gap portion to the volume of the flow path portion, for the related art structure of the flow path connection unit illustrated in FIG. 16 and the structure of the flow path connection unit of the present embodiment illustrated in FIG. 4C, by large deformation analysis using the finite element method.

The sealing material model uses a nonlinear Neo-Hooken (Beomkeun Kim et.al.: International Journal of Precision Engineering and Manufacturing, 13, pp. 759-764 (2012)) model, and the initial shear modulus of the set parameters was 3.3 MPa, Poisson's ratio was 0.4999. Since it is a rotating body, calculations were performed using a two-dimensional axis target model. Analysis was performed using ANSYS Workbench 19.2 (manufactured by ANSYS, Inc.).

In the related art structure of the flow path connection unit, the ratio of the remaining liquid is about 0.9%, while in the structure of the flow path connection unit of the present embodiment, the ratio of the remaining liquid can be reduced to about 0.5%.

FIG. 9 illustrates the measurement results of a holding force and an adhesion force of the sealing material for the related art structure of the flow path connection unit illustrated in FIG. 16 and the structure of the flow path connection unit of the present embodiment illustrated in FIG. 4C.

The holding force of the sealing material was determined by applying a fast-curing adhesive to the surface of the sealing material after fitting the sealing material into a concave portion of the housing or the fixing recess, fixing the sealing material to a jig connected to a tensile testing machine, raising the jig, and measuring a maximum load until the sealing material is removed.

The adhesion force of the sealing material was determined by using a sheet sample made of the same material and area as the sealing material and a plate material made of the same material as the housing, bringing the sample into pressure contact with the plate material for a certain period of time, applying the fast-curing adhesive to the upper surface of the sample, and fixing the sample to the jig connected to the tensile testing machine, raising the jig, and measuring a maximum load until the sample is removed.

The vertical axis of FIG. 9 represents a difference between the holding force and the adhesion force, and when the holding force is greater than the adhesion force, the difference becomes a positive value. Compared with the related art structure of the flow path connection unit, the holding force for the structure of the flow path connection unit of the present embodiment greatly exceeds the adhesion force. This indicates that it is possible to prevent the sealing material from falling off during electrode replacement and to prevent the replacement work from becoming complicated.

FIG. 10 shows the measurement results of the surface uneven shape with the sealing material attached to the ion-selective electrode housing for the related art structure of the flow path connection unit illustrated in FIG. 16 and the structure of the flow path connection unit of the present embodiment illustrated in FIG. 4C.

The center (0 points) of the horizontal axis of FIG. 10 indicates a center of the flow path. It was found that the peripheral portion has a protruding shape in the related art structure, but the vicinity of the center of the flow path protrudes the most in the structure of the present embodiment. With a structure of the present embodiment, when the ion-selective electrode and the electrolyte measuring structure are connected to each other, the sealing material begins to come into contact with the vicinity of the flow path, so that the vicinity of the flow path is reliably sealed. Since a volume of a gap between the other electrolyte measuring structure and the sealing material can be reduced in the portion connected to the flow path, a retained amount of a part of the sample solution flowing through the flow path can be effectively reduced.

FIG. 12 is a schematic diagram illustrating an example of an electrolyte measuring device using the electrolyte measuring structure of FIG. 1.

A recording calculation unit 1271, a control unit 1272, and a display unit 1273 are connected to a measuring unit 1251. The measuring unit 1251 includes a dilution tank 1270, ion-selective electrodes 1261, 1262, and 1263, a reference electrode 1255, a flow path connection structure 1254, 1256, 1260, and 1264, a potential measuring unit 1265, pipes 1252, 1257, and 1266, a pump 1258, dispensing nozzles 1267, 1268, and 1269, and a reference liquid 1253, and a waste liquid tank 1259.

Here, the electrolyte measuring structure is the ion-selective electrodes 1261, 1262, and 1263, the reference electrode 1255, and the flow path connection structures 1254, 1256, 1260, and 1264.

Using the dispensing nozzle, samples such as blood and urine, diluents, and internal standard solutions are dispensed and discharged into the dilution tank 1270. The solution in the dilution tank 1270 is sucked by the pump 1266.

The solution sucked from the dilution tank 1270 is introduced into the flow path of the ion-selective electrodes 1263, 1262, and 1261 through the pipe 1266, and further wasted into the waste liquid tank 1259 through the pipe 1257 and the pump 1258. On the other hand, the reference liquid 1253 is introduced into the flow path of the reference electrode 1255 through the pipe 1252, and further wasted into the waste liquid tank 1259 through the pipe 1257 and the pump 1258. The terminal of the electrode is connected to the potential measuring unit 1265.

FIG. 11 shows the results of an electrolyte concentration measurement deviation confirmation experiment using the electrolyte measuring device illustrated in FIG. 12 for the related art structure of the flow path connection unit illustrated in FIG. 15 (related art structure 1), the related art structure of the flow path connection unit illustrated in FIG. 16 (related art structure 2), and the structure of the flow path connection of the present embodiment illustrated in FIG. 4C.

In the experiment, the deviation of the measured value when measuring the concentration of concentrated potassium solution (80 mmol/L or 100 mmol/L) was evaluated. Since the concentration measurement reflects individual differences in the electrodes to be used, and different electrodes were to be used in the measurement of the related art structure 2 and the evaluation of the structure of the present embodiment, in each measurement, the deviation of the measured value of potassium concentration when using the sealing material of the related art structure 1 as the sealing material with the electrode housing in common was evaluated, and the ratio of the deviation of the measured value of potassium concentration when using the sealing material of the corresponding structure with respect to this value was defined as a normalized deviation.

The normalized deviation in the structure of the present embodiment is about 0.6, which is smaller than the normalized deviation in the related art structure 2, which is about 0.8.

Modification

FIGS. 13A and 13B are schematic diagrams illustrating other configuration examples for the flow path connection unit of the electrolyte measuring structure of the invention.

FIG. 13A illustrates the schematic diagram of a flow path connection unit with the sealing material attached to the electrolyte measuring structure. The structure of the range not depicted in this drawing is the same as the structures described above (FIGS. 4A to 4C).

In this structure, an average thickness of the sheet region 405a at a position adjacent to the second hole 407 is greater than the average thickness of the connection portion between the sheet region 405a and the protrusion region 405b. Further, in FIG. 13A, in the sheet region 405a, the first portion is formed to have a width in an outer peripheral direction from the second hole, and a region having a thickness of the first portion is large. Therefore, when pulling apart the plurality of electrolyte measuring structures from each other, by increasing the thickness of the first portion that separates at the end, the elastic body recovery force of the sealing material from the start of the separation to the end can support the separation of portions other than the first portion.

Further, as illustrated in FIG. 13B, an uneven structure 1301 may be provided on the front surface of the sheet region 405a. However, the depth of this uneven structure is shallower than the difference between the average thickness of the sheet region 405a at the position adjacent to the second hole 407 and the average thickness of the connection portion between the sheet region 405a and the protrusion region 405b.

With such a structure, when the electrolyte measuring structure is connected, the sealing material begins to come into contact with the vicinity of the flow path, so that the vicinity of the flow path is sealed. Since the volume of the gap between the other electrolyte measuring structure connected to the flow path and the sealing material can be reduced, the retained amount of a part of the sample solution flowing through the flow path can be effectively reduced.

FIG. 14 is a schematic diagram illustrating yet another configuration example of the invention for the flow path connection unit of the electrolyte measuring structure. An enlarged view of a flow path connection unit with the sealing material attached to the electrolyte measuring structure is illustrated. The structure of the range not depicted in this drawing is the same as the structures described above (FIGS. 4A to 4C).

In this structure, an example is illustrated in which there is a portion in which the average thickness decreases toward an outer periphery from the second hole 407 of the sheet region 405a, and in the middle, there is a portion in which the average thickness increases toward the outer periphery with a complete turnaround.

Even in such a case, when the relationship is maintained in which the protrusion amount of the first portion of the sheet region 405a is larger than the protrusion amount of the second portion of the protrusion region 405b, the sealing material 405 begins to come into contact with the vicinity of the flow path when the electrolyte measuring structure is connected, and thus the vicinity of the flow path is sealed. Even in this example, since the same effect as in the present embodiment can be achieved, and the volume of the gap between the other electrolyte measuring structure connected to the flow path and the sealing material can be reduced, the retained amount of a part of the sample solution flowing through the flow path can be effectively reduced.

From the above, according to the electrolyte measuring structure, the ion-selective electrode can be configured using the electrolyte measuring structure, and when the plurality of electrolyte measuring structures are connected to configure the electrolyte measuring device, it is possible to achieve two advantageous effects: the sealing material can be prevented from falling off when replacing the electrolyte measuring structure, and the retained amount of the sample solution in the gap of the flow path connection unit can be reduced, thereby reducing the influence on the measurement results.

Note that the invention is not limited to the above-described embodiments, and includes various modifications.

The embodiments described above are those described in detail to describe the invention in an easy-to-understand manner, and are not necessarily limited to those having all the configurations described. The configuration of another embodiment can be added to, deleted from, or replaced with the configuration of one embodiment.

REFERENCE SIGNS LIST

100: electrolyte measuring structure
101, 401: main body
101a, 401a: flow path
102, 402: flow path connection unit
103, 403: flow path connection unit
300: ion-selective electrode
301: sensitive membrane
302: internal liquid
303: electrode
404: fixing structure
404a: first protrusion
404b: second protrusion
404c: fixing recess
405: sealing material
405a: sheet region
405b: protrusion region
406: first hole
407: second hole
1251: measuring Unit
1252, 1257, 1266: pipe
1253: reference liquid
1254, 1256, 1260, 1264: flow path connection structure
1255: reference electrode
1258: pump
1259: waste liquid tank
1261, 1262, 1263: ion-selective electrode
1265: potential measuring unit
1267, 1268, 1269: dispensing nozzle
1270: dilution tank
1271: recording calculation unit
1272: control unit
1273: display unit

The invention claimed is:

1. An electrolyte measuring structure comprising a housing and a sealing material, and being connectable to another electrolyte measuring structure via the sealing material, wherein the housing includes a main body having a flow path therethrough and a fixing structure for fixing the sealing material to the main body, wherein the fixing structure includes a first protrusion having a first hole connected to the flow path, a second protrusion formed on an outer periphery of the first protrusion, and a fixing recess for detachably fixing the sealing material formed by the first protrusion and the second protrusion, wherein the sealing material includes a front surface designed to be in contact with the other electrolyte measuring structure, and a back surface designed to be in contact with the fixing structure, and is an elastic body in which a sheet region that is a sheet-like region, and a protrusion region provided on an outer peripheral side surface of the sheet region and embedded in the fixing recess are integrally molded, wherein the sheet region has a second hole arranged at a position corresponding to the first hole in a state where the sealing material is fixed to the fixing structure, and wherein in a state where the sealing material is fixed to the fixing structure and is not in contact with the other electrolyte measuring structure, a first protrusion amount defined below is larger than a second protrusion amount:

the first protrusion amount protrudes from a front surface of the sheet region, and the second protrusion amount protrudes from a front surface of the protrusion region, and when viewed in a cross-section passing through a central axis of the second hole in a state where the sealing material is removed from the fixing structure:

(i) a first slope defined below is smaller than a second slope:

(ii) the first slope is an average slope of the front surface of the sheet region, and (iii) the second slope is an average slope of the front surface of the protrusion region.

2. The electrolyte measuring structure according to claim 1, wherein the protrusion region of the sealing material is sandwiched between respective side surfaces of the first protrusion and the second protrusion forming the fixing recess, and is pressed and fixed.

3. The electrolyte measuring structure according to claim 1, wherein based on the second hole, a protrusion amount of a portion farther than the first portion of the sheet region is smaller than the protrusion amount of the first portion.

4. The electrolyte measuring structure according to claim 1, wherein the first portion is a portion adjacent to the second hole.

5. The electrolyte measuring structure according to claim 4, wherein an inner surface of the sealing material forming the second hole projects in a direction of a center of the second hole.

6. The electrolyte measuring structure according to claim 4, wherein a thickness of the first portion is larger than an average thickness of a connection portion between the sheet region and the protrusion region.

7. The electrolyte measuring structure according to claim 4, wherein in a state where the sealing material is removed from the fixing structure, in the sheet region, the average thickness and the average protrusion amount are gradually reduced from the first portion to the protrusion region.

8. A flow-type ion-selective electrode comprising the electrolyte measuring structure according to claim 1.

9. An electrolyte measuring device comprising the electrolyte measuring structure according to claim 1.

* * * * *